(12) United States Patent
Zhou et al.

(10) Patent No.: US 10,680,662 B2
(45) Date of Patent: Jun. 9, 2020

(54) WIRELESS SENSOR NODE WITH HIERARCHICAL PROTECTION STRUCTURE

(71) Applicants: CHINA UNIVERSITY OF MINING AND TECHNOLOGY, Xuzhou, Jiangsu (CN); XUZHOU ZHIRUN MINING EQUIPMENT SCIENCE AND TECHNOLOGY CO., LTD, Xuzhou, Jiangsu (CN)

(72) Inventors: Gongbo Zhou, Jiangsu (CN); Zhencai Zhu, Jiangsu (CN); Hao Chen, Jiangsu (CN); Houlian Wang, Jiangsu (CN); Chaoquan Tang, Jiangsu (CN); Wei Li, Jiangsu (CN); Guohua Cao, Jiangsu (CN); Yuxing Peng, Jiangsu (CN); Gang Shen, Jiangsu (CN)

(73) Assignees: CHINA UNIVERSITY OF MINING AND TECHNOLOGY, Xuzhou, Jiangsu (CN); XUZHOU ZHIRUN MINING EQUIPMENT SCIENCE AND TECHNOLOGY CO., LTD, Xuzhou, Jiangsu (CN)

( * ) Notice: Subject to any disclaimer, the term of this patent is extended or adjusted under 35 U.S.C. 154(b) by 0 days.

(21) Appl. No.: 16/076,686

(22) PCT Filed: Dec. 27, 2017

(86) PCT No.: PCT/CN2017/118974
§ 371 (c)(1),
(2) Date: Aug. 8, 2018

(87) PCT Pub. No.: WO2018/223671
PCT Pub. Date: Dec. 13, 2018

(65) Prior Publication Data
US 2020/0091945 A1 Mar. 19, 2020

(30) Foreign Application Priority Data

Jun. 5, 2017 (CN) .......................... 2017 1 0411252

(51) Int. Cl.
H04W 84/18 (2009.01)
H04B 1/03 (2006.01)
(52) U.S. Cl.
CPC .............. *H04B 1/03* (2013.01); *H04W 84/18* (2013.01)
(58) Field of Classification Search
CPC .................................................... H04W 84/18
See application file for complete search history.

(56) References Cited

FOREIGN PATENT DOCUMENTS

| CN | 103152841 A | 6/2013 |
|---|---|---|
| CN | 103260266 A | 8/2013 |

(Continued)

*Primary Examiner* — Ankur Jain
(74) *Attorney, Agent, or Firm* — Foley & Lardner LLP

(57) ABSTRACT

The present invention discloses a wireless sensor node with a hierarchical protection structure, including a node hardware circuit and a node hierarchical protection structure. The node hardware circuit includes a sensor module, a data processor module and a wireless communication module, and the node hierarchical protection structure includes a primary sealed protection structure and a secondary strengthened protection structure; the primary sealed protection structure includes an ABS spherical inner shell; the data processor module and the wireless communication module are disposed in the ABS spherical inner shell; gaps in the ABS spherical inner shell are filled with EPE cushioning foam; a flame-retardant and thermal-insulating layer made of a nanometer aerogel insulation blanket is covered on the outside of the ABS spherical inner shell; the secondary strengthened protection structure includes a spherical nylon outer shell with vent holes; the spherical nylon outer shell and the ABS spherical inner shell are connected with (Continued)

each other through support of rubber dampers; and the sensor module is disposed in the spherical nylon outer shell. The node according to the present invention can be deployed by ejection, is highly adaptive to catastrophes, can acquire environmental information effectively, and has relatively low costs.

5 Claims, 6 Drawing Sheets

(56) References Cited

FOREIGN PATENT DOCUMENTS

| | | | |
|---|---|---|---|
| CN | 105953834 A | | 9/2016 |
| CN | 106644190 A | * | 5/2017 |
| CN | 106644190 A | | 5/2017 |
| CN | 107241816 A | | 10/2017 |

* cited by examiner

US 10,680,662 B2

WIRELESS SENSOR NODE WITH HIERARCHICAL PROTECTION STRUCTURE

BACKGROUND OF THE INVENTION

Technical Field

The present invention relates to a wireless sensor node, and in particular, to an emergency rescue sensor node for acquiring post-disaster environmental information.

Background Art

In the field of emergency rescue sensor networks, an emergency spot is usually a place with flammable and explosive as well as poisonous and harmful materials, and this is adverse to temporary deployment of sensor nodes. A severe working environment easily damages node circuit modules, and it is difficult to acquire environmental information. Existing emergency rescue sensor nodes generally have the following defects: it is difficult to deploy the nodes, it is difficult to acquire environmental information, core circuit modules are easily damaged, and so on. Therefore, to design an emergency rescue sensor node that is easy to deploy and capable of working reliably in a catastrophic environment is of great significance for improving rescue efficiency and ensuring life and property safety.

A "wireless sensor node buffering protector" disclosed in Chinese Patent No. CN103152841A includes a spherical shell, a frame and buffering springs. Compared with the existing sensor node, the buffering protector improves damping performance. However, the buffering protector employs a fully closed packaging manner, causing a sensor module to be insulated from the external environment, and therefore it is difficult to acquire environmental information. When a violent collision occurs, a damping requirement can hardly be met by using the buffering springs only, and node hardware modules will be thus damaged. Meanwhile, the spring is made of metal, and multiple metal springs distributed around the node will absorb electromagnetic waves and reduce communication quality of the node. As no flame-retardant and thermal-insulating layer is disposed, the buffering protector cannot work normally in special application environments such as a fire disaster. The spherical shell is connected through welding, which is adverse to assembly, disassembly, and reuse, and increases costs.

A "mining wireless sensor node with buffering protection function" disclosed in Chinese Patent No. CN103260266A includes a mining sensor node, a square board, arc boards, a spherical shell, buffering boxes, and buffering rods. The node is developed for a special application environment of underground coal mine, and can effectively protect node hardware in a severe environment such as a tunnel collapse. However, the node has to be fixedly mounted on the ground, and cannot be flexibly deployed after a catastrophe. Therefore, it is difficult to popularize the node in the field of emergency rescue sensor networks.

SUMMARY OF THE INVENTION

Objective of the present invention: In order to solve the problems such as difficult deployment, poor resistance against disasters, a weak capability of acquiring environmental information, and high costs of an existing emergency rescue sensor node, the present invention provides a wireless sensor node that can be deployed by ejection, is highly adaptive to catastrophes, can acquire environmental information effectively, and has relatively low costs.

Technical solution: In order to achieve the foregoing objective, the present invention employs the following technical solution:

A wireless sensor node with a hierarchical protection structure mainly includes a node hardware circuit and a node hierarchical protection structure. The node hardware circuit includes a sensor module, a data processor module and a wireless communication module, and the node hierarchical protection structure includes a primary sealed protection structure and a secondary strengthened protection structure; the primary sealed protection structure includes an ABS spherical inner shell; the data processor module and the wireless communication module are disposed in the ABS spherical inner shell; gaps in the ABS spherical inner shell are filled with EPE cushioning foam; a flame-retardant and thermal-insulating layer made of a nanometer aerogel insulation blanket is covered on the outside of the ABS spherical inner shell; the secondary strengthened protection structure includes a spherical nylon outer shell disposed on the outside of the ABS spherical inner shell; an inner wall of the spherical nylon outer shell and an outer wall of the ABS spherical inner shell are connected and supported by a group of rubber dampers; the sensor module is disposed between the inner wall of the spherical nylon outer shell and the outer wall of the ABS spherical inner shell; and vent holes are provided on the spherical nylon outer shell.

In the present invention, the primary sealed protection structure is used for protecting the data processor module and the wireless communication module, and the secondary strengthened protection structure is used for protecting the sensor module while ensuring that the sensor module can fully contact with the external environment.

Specifically, the ABS spherical inner shell includes an ABS spherical inner shell upper cover and an ABS spherical inner shell lower cover that are connected through bolts, and a joint between the ABS spherical inner shell upper cover and the ABS spherical inner shell lower cover is sealed by using a waterproof rubber ring. A split-type structural design facilitates assembly of components. Moreover, the use of bolt connection ensures the mounting reliability of the ABS spherical inner shell, thus avoiding scattering of components during ejection deployment.

Specifically, the spherical nylon outer shell includes a spherical nylon outer shell upper cover and a spherical nylon outer shell lower cover that are connected through bolts. A split-type structural design facilitates assembly of components. Moreover, the use of bolt connection ensures the mounting reliability of the spherical nylon outer shell, thus avoiding scattering of components during ejection deployment.

Specifically, a wire via hole is provided on the ABS spherical inner shell, and fastening of a wire and sealing of the wire via hole are accomplished by using an AB adhesive.

Specifically, the sensor module includes one or two or more of a temperature and humidity sensor, a gas concentration sensor, a light intensity sensor, and a camera, which can be adjusted properly according to a specific application environment. The data processor module mainly includes a microcontroller unit (MCU) chip, a crystal oscillator circuit, and a signal conditioning circuit. The wireless communication module mainly includes a wireless transceiver chip and a PCB antenna.

Beneficial effects: The wireless sensor node with a hierarchical protection structure provided by the present invention has the following advantages compared with the prior art: 1. A hierarchical protection strategy is employed; the spherical nylon outer shell with vent holes enables the sensor module to fully contact with the external environment, thereby ensuring the accuracy of environmental information acquisition; the ABS spherical inner shell completely insulates the data processor module and the wireless communication module from the external environment, thus ensuring the viability of core hardware of the node in a severe environment. 2. The two-stage cushioning using the rubber dampers and the EPE cushioning foam makes the node strong enough to resist against collision impact caused by ejection deployment. 3. The node protection structure employs a material with good wave permeability, such as engineering plastic or rubber, which can ensure that quality of communication between nodes is not affected. 4. The flame-retardant and thermal-insulating layer made of a nanometer aerogel insulation blanket makes the node adaptive to high-temperature application environments such as a fire disaster. 5. The waterproof rubber ring enhances the air tightness and water resistance of the ABS spherical inner shell.

DETAILED DESCRIPTION OF THE INVENTION

The present invention is described in further detail below with reference to the accompanying drawings.

Figure 1:
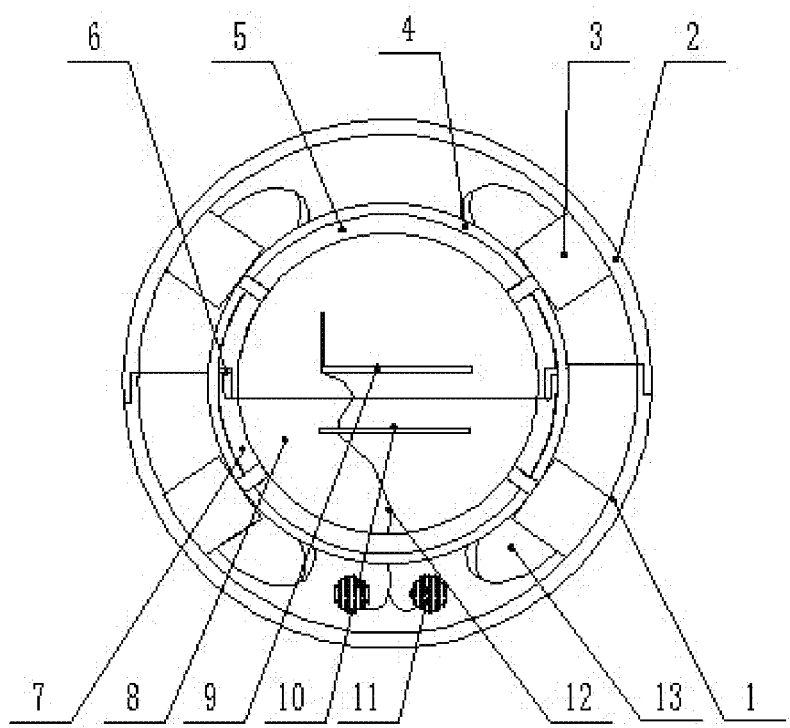
FIG. 1 is an overall schematic structural view of the present invention.

FIG. 1 shows a wireless sensor node with a hierarchical protection structure, mainly including a node hardware circuit and a node hierarchical protection structure. The node hardware circuit includes a sensor module 11, a data processor module 10 and a wireless communication module 9, and the node hierarchical protection structure includes a primary sealed protection structure and a secondary strengthened protection structure. The primary sealed protection structure includes an ABS spherical inner shell 15. The data processor module 10 and the wireless communication module 9 are disposed in the ABS spherical inner shell 15. Gaps in the ABS spherical inner shell 15 are filled with EPE cushioning foam 8. A flame-retardant and thermal-insulating layer 4 made of a nanometer aerogel insulation blanket is covered on the outside of the ABS spherical inner shell 15. The secondary strengthened protection structure includes a spherical nylon outer shell disposed on the outside of the ABS spherical inner shell 15. An inner wall of the spherical nylon outer shell and an outer wall of the ABS spherical inner shell 15 are connected and supported by a group of rubber dampers 3. The sensor module 11 is disposed between the inner wall of the spherical nylon outer shell and the outer wall of the ABS spherical inner shell 15. Vent holes 13 are provided on the spherical nylon outer shell.

In the structure of the present invention, the data processor module 10 and the wireless communication module 9 are disposed in the ABS spherical inner shell 15 in a sealed manner. The EPE cushioning foam 8 is used for damping and cushioning of the data processor module 10 and the wireless communication module 9. The sensor module 11 is disposed between the inner wall of the spherical nylon outer shell and the outer wall of the ABS spherical inner shell 15. The vent holes 13 on the spherical nylon outer shell can ensure sufficient contact between the sensor module 11 and the external environment.

Figure 2:
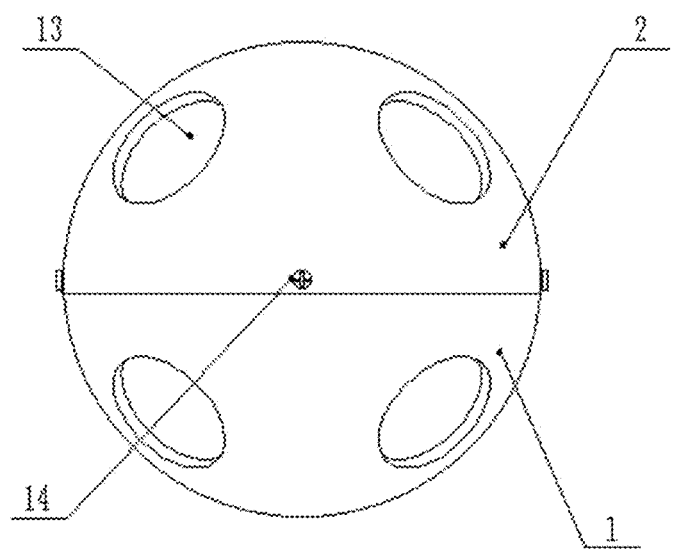
FIG. 2 is a front schematic structural view of a spherical nylon outer shell according to the present invention.
Figure 3:
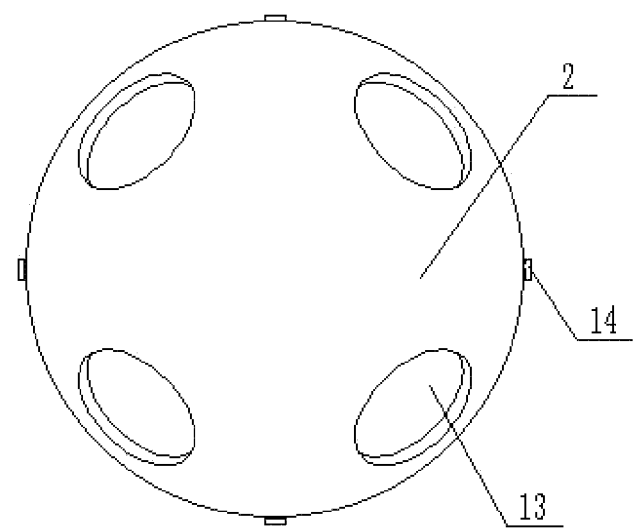
FIG. 3 is a top schematic structural view of a spherical nylon outer shell according to the present invention.
Figure 4:
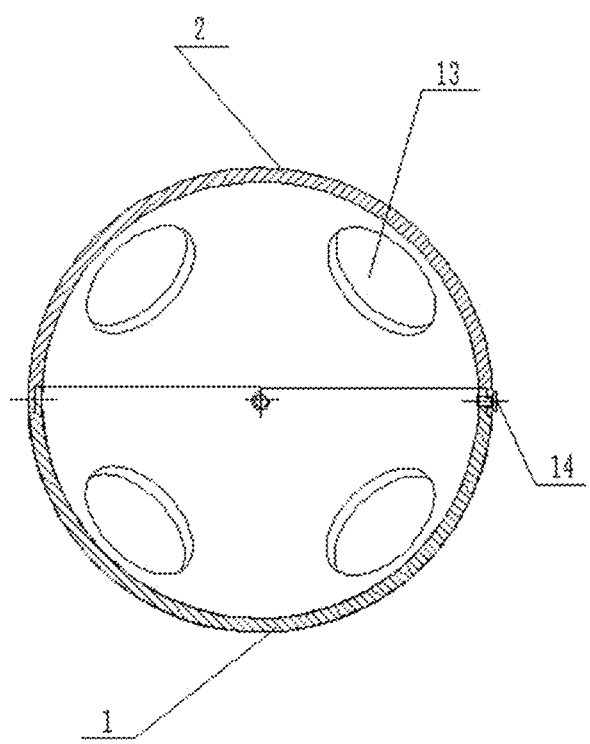
FIG. 4 is a cross-sectional schematic view of a spherical nylon outer shell according to the present invention.

As shown in FIG. 2, FIG. 3 and FIG. 4, the spherical nylon outer shell includes a spherical nylon outer shell upper cover 2 and a spherical nylon outer shell lower cover 1. The spherical nylon outer shell upper cover 2 and the spherical nylon outer shell lower cover 1 are connected through four uniformly distributed plastic bolts 14. Eight vent holes 13 are uniformly distributed on the spherical nylon outer shell to ensure that the sensor module 11 can fully contact with the external environment.

Figure 5:
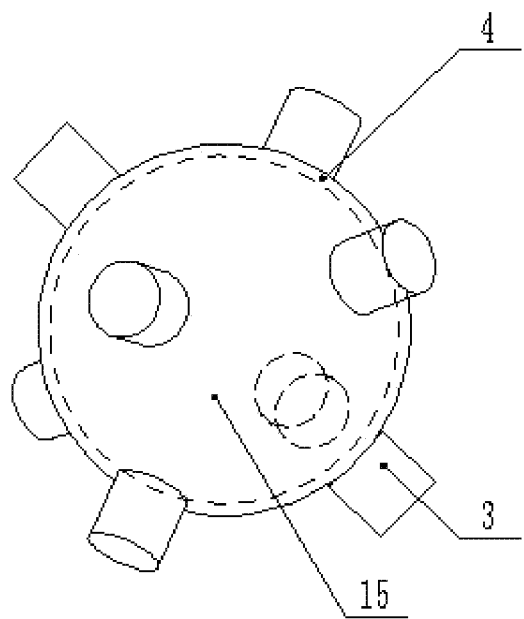
FIG. 5 is a schematic view of distribution of rubber dampers according to the present invention.

As shown in FIG. 5, a flame-retardant and thermal-insulating layer 4 made of a nanometer aerogel insulation blanket is covered on the external surface of the ABS spherical inner shell 15 to enhance the adaptability of the ABS spherical inner shell 15 under high temperature. Eight uniformly distributed rubber dampers 3 are used for achieving cushioning and damping in an ejection deployment process.

Figure 6:
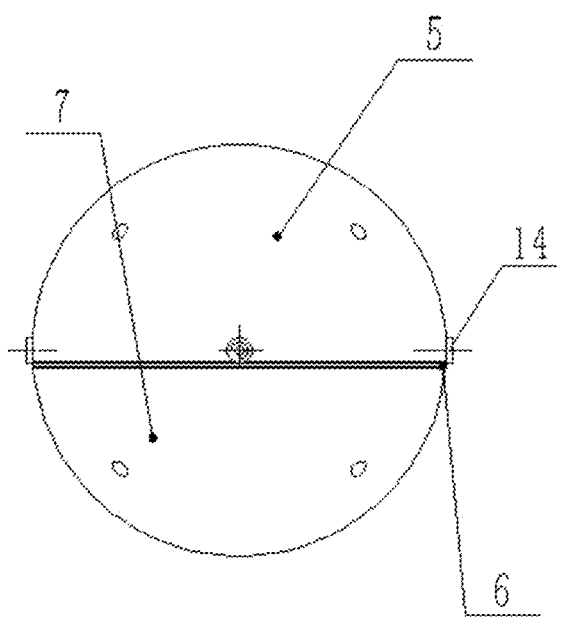
FIG. 6 is a front schematic structural view of an ABS spherical inner shell according to the present invention.
Figure 7:
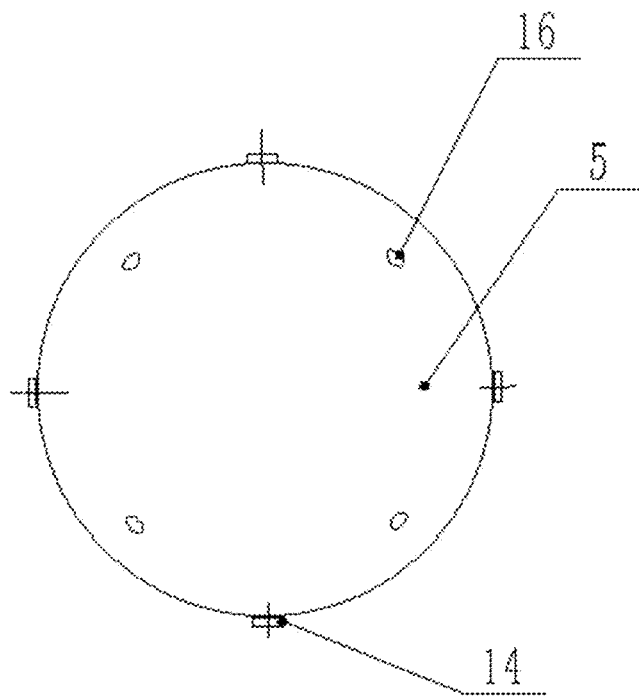
FIG. 7 is a top schematic structural view of an ABS spherical inner shell according to the present invention.
Figure 8:
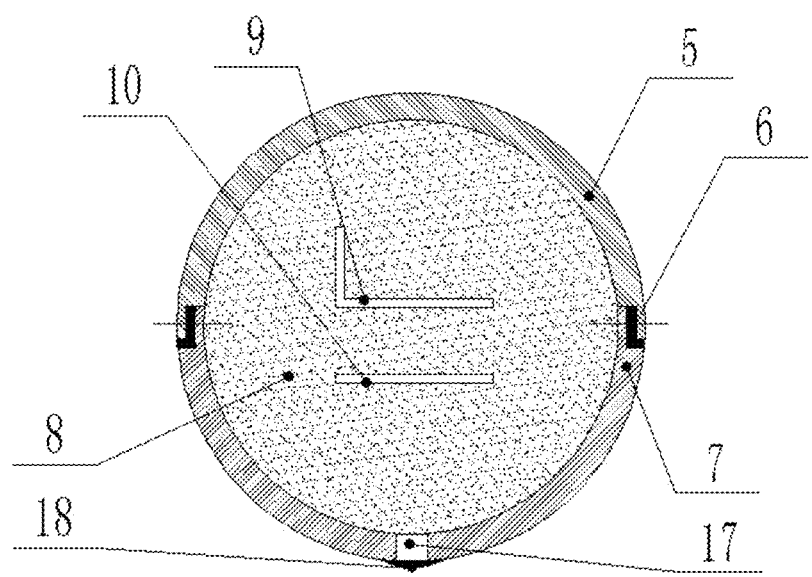
FIG. 8 is a cross-sectional schematic view of an ABS spherical inner shell according to the present invention.

As shown in FIG. 6, FIG. 7 and FIG. 8, the ABS spherical inner shell 15 includes an ABS spherical inner shell upper cover 5 and an ABS spherical inner shell lower cover 7. The ABS spherical inner shell upper cover 5 and the ABS spherical inner shell lower cover 7 are connected through four uniformly distributed plastic bolts 14. A joint between the ABS spherical inner shell upper cover 5 and the ABS spherical inner shell lower cover 7 is sealed by using a waterproof rubber ring 6. Eight screw holes 16 are uniformly distributed on the surface of the ABS spherical inner shell 15, and are used for fixing the eight rubber dampers 3. EPE cushioning foam 8 is filled inside the ABS spherical inner shell 15, to achieve cushioning and damping of the data processor module 10 and the wireless communication module 9 in the ejection deployment process. A wire via hole 17 is provided on the ABS spherical inner shell lower cover 7. The sensor module 11 can transmit acquired data to the data processor module 10 through a wire 12, and then the data is sent out by using the wireless communication module 9. After being led out, the wire 12 is sealed in the wire via hole 17 by using an AB adhesive 18, so as to ensure the air tightness inside the ABS spherical inner shell 15.

Figure 9:
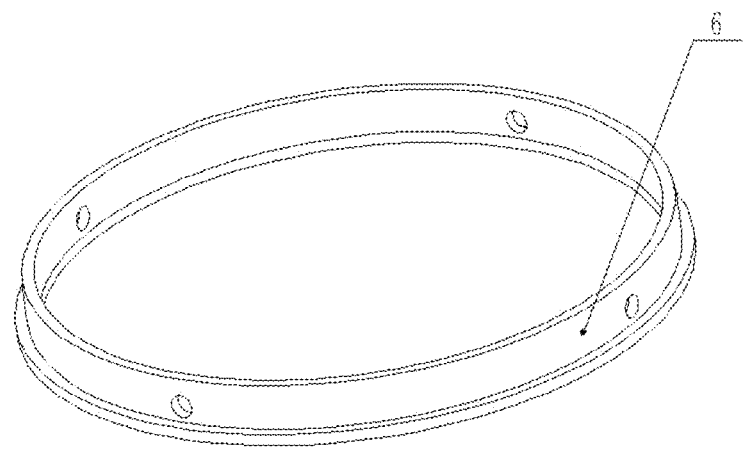
FIG. 9 is a schematic structural view of a waterproof rubber ring according to the present invention.

As shown in FIG. 9, four connection holes are uniformly provided on the periphery of the waterproof rubber ring 6, so as to adapt to the sealed connection between the ABS spherical inner shell upper cover 5 and the ABS spherical inner shell lower cover 7.

Figure 10:
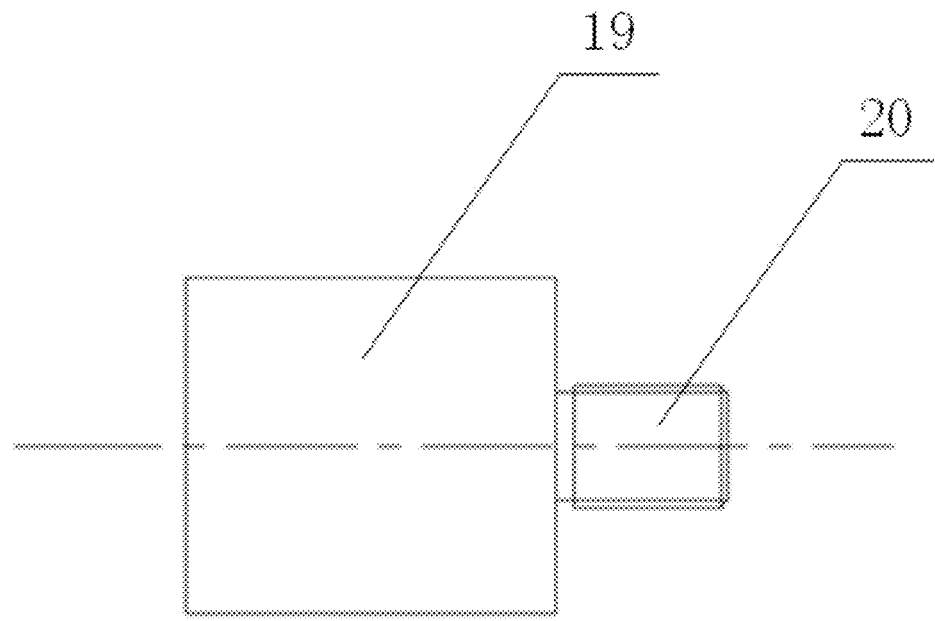
FIG. 10 is a schematic structural view of a rubber damper according to the present invention.
Figure 11:
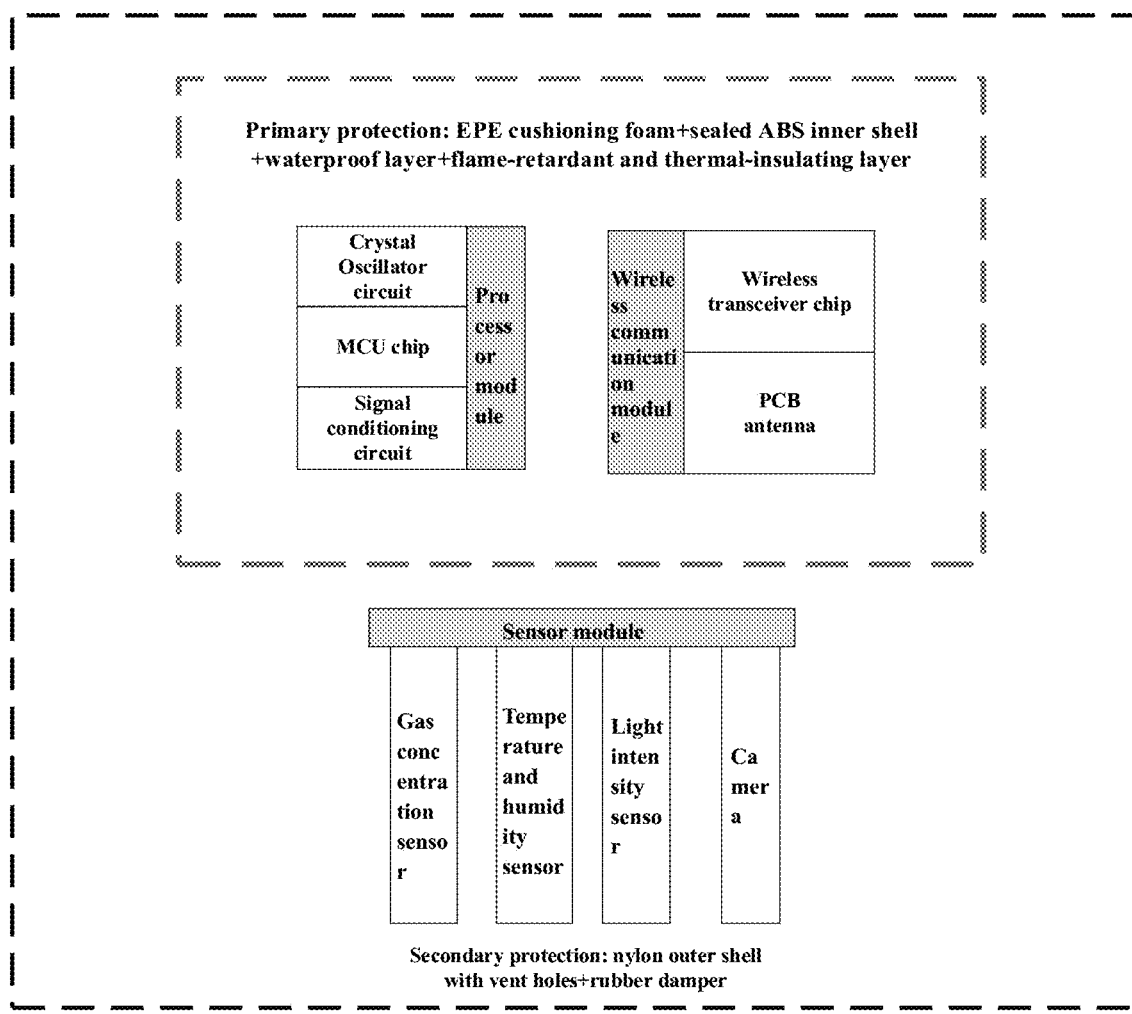
FIG. 11 is an overall schematic architectural view of the present invention The drawings include: 1. a spherical nylon outer shell lower cover; 2. a spherical nylon outer shell upper cover; 3. rubber dampers; 4. a flame-retardant and thermal-insulating layer made of a nanometer aerogel insulation blanket; 5. an ABS spherical inner shell upper cover; 6. a waterproof rubber ring; 7. an ABS spherical inner shell lower cover; 8. EPE cushioning foam; 9. a wireless communication module; 10. a data processor module; 11. a sensor module; 12. a wire; 13. vent holes; 14. plastic bolts; 15. an ABS spherical inner shell; 16. screw holes; 17. a wire via hole; 18. an AB adhesive; 19. a natural rubber block; and 20. a plastic screw.

As shown in FIG. 10, the rubber damper 3 consists of a natural rubber block 19 and a plastic screw 20. The plastic screw 20 and the screw hole 16 implement connection between the rubber damper 3 and the ABS spherical inner shell 15.

Described above are merely preferred implementations of the present invention. It should be pointed out that a person of ordinary skill in the art can further make several improvements and modifications without departing from the principle of the present invention. These improvements and modifications should also be regarded as the protection scope of the present invention.

What is claimed is:

1. A wireless sensor node with a hierarchical protection structure, characterized by mainly comprising a node hardware circuit and a node hierarchical protection structure, wherein the node hardware circuit comprises a sensor module (11), a data processor module (10) and a wireless communication module (9), and the node hierarchical protection structure comprises a primary sealed protection structure and a secondary strengthened protection structure; the primary sealed protection structure comprises an ABS spherical inner shell (15); the data processor module (10) and the wireless communication module (9) are disposed in the ABS spherical inner shell (15); gaps in the ABS spherical inner shell (15) are filled with EPE cushioning foam (8); a flame-retardant and thermal-insulating layer (4) made of a nanometer aerogel insulation blanket is covered on the outside of the ABS spherical inner shell (15); the secondary strengthened protection structure comprises a spherical nylon outer shell disposed on the outside of the ABS spherical inner shell (15); an inner wall of the spherical nylon outer shell and an outer wall of the ABS spherical inner shell (15) are connected and supported by a group of rubber dampers (3); the sensor module (11) is disposed between the inner wall of the spherical nylon outer shell and the outer wall of the ABS spherical inner shell (15); and vent holes (13) are provided on the spherical nylon outer shell.

2. The wireless sensor node with a hierarchical protection structure according to claim 1, characterized in that: the ABS spherical inner shell (15) comprises an ABS spherical inner shell upper cover (5) and an ABS spherical inner shell lower cover (7) that are connected through bolts, and a joint between the ABS spherical inner shell upper cover (5) and the ABS spherical inner shell lower cover (7) is sealed by using a waterproof rubber ring (6).

3. The wireless sensor node with a hierarchical protection structure according to claim 1, characterized in that: the spherical nylon outer shell comprises a spherical nylon outer shell upper cover (2) and a spherical nylon outer shell lower cover (1) that are connected through bolts.

4. The wireless sensor node with a hierarchical protection structure according to claim 1, characterized in that: a wire via hole (17) is provided on the ABS spherical inner shell (15), and fastening of a wire (12) and sealing of the wire via hole (17) are accomplished by using an AB adhesive (18).

5. The wireless sensor node with a hierarchical protection structure according to claim 1, characterized in that: the sensor module (11) comprises one or two or more of a temperature and humidity sensor, a gas concentration sensor, a light intensity sensor, and a camera.

* * * * *